(No Model.)

C. T. PRATT.
SLEEVE FOR TAPER DRILLS.

No. 473,639. Patented Apr. 26, 1892.

Attest:
C. W. Benjamin
M. E. Finley

Inventor:
Charles T. Pratt.
by D. Walter Brown,
his attorney.

THE NORRIS PETERS CO., PHOTO-LITHO., WASHINGTON, D. C.

UNITED STATES PATENT OFFICE.

CHARLES T. PRATT, OF CLAYVILLE, NEW YORK, ASSIGNOR TO THE PRATT CHUCK COMPANY, OF SAME PLACE.

SLEEVE FOR TAPER DRILLS.

SPECIFICATION forming part of Letters Patent No. 473,639, dated April 26, 1892.

Application filed August 13, 1891. Serial No. 402,578. (No model.)

*To all whom it may concern:*

Be it known that I, CHARLES T. PRATT, a citizen of the United States, and a resident of Clayville, in the county of Oneida, State of New York, have invented a certain new and useful Improvement in Sleeves for Taper Drills, of which the following is a specification.

My invention relates to improvements in sleeves for taper drills; and the object of the improvement is to adapt drills with taper shanks to use in chucks the gripping-jaws whereof have a true rectilinear movement in the chuck. A chuck of the said class was patented to me in Letters Patent of the United States No. 434,460, and bearing date August 19, 1890. Said chucks are only adapted to be used with drills which have shanks of cylindrical shape and not to drills which have taper shanks, since the teeth of the jaws are formed so as to normally close only on a cylindrical shank and the guides of the jaws prevent said jaws adapting themselves to a taper of the drill-shank.

In my present improvement I have devised removable and adjustable sleeves to be slipped on and off the taper shanks of the drills, and which sleeves are shaped internally to fit the taper of the shank and externally are true cylinders, so as to be firmly grasped by the jaws of the chuck.

My invention relates, also, to longitudinal slots in the sleeves to give spring to the sleeves for the purposes hereinafter set forth.

Figure 1:
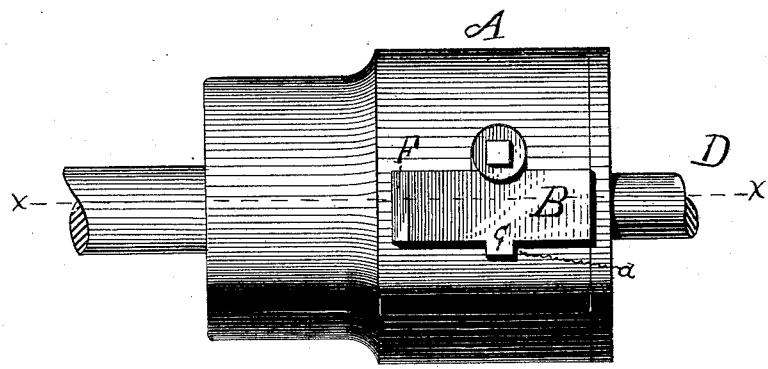
Figure 2:
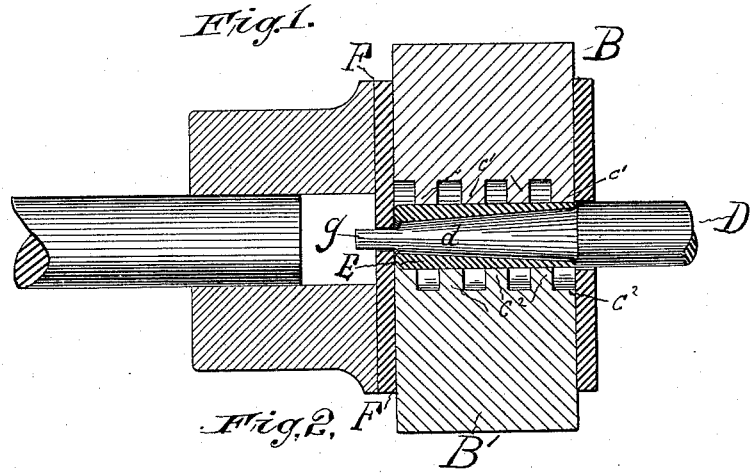
Figures 3, 4:
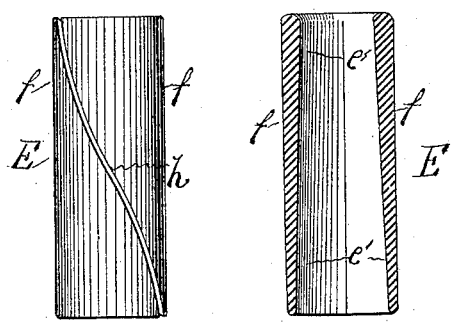

Referring now to the drawings which accompany the specification to aid in the description, Figure 1 is an elevation of the chuck, showing a broken drill projecting from the front end of the chuck. Fig. 2 is a longitudinal section of the chuck and sleeve on the line $x$ $x$ of Fig. 1. The drill is shown in broken elevation. Fig. 3 is an elevation of sleeve with a helicoidal slot. Fig. 4 is a view of one-half a solid sleeve.

The device is adapted to be used in any chuck A which has jaws B B' that are guided so as to slide in and out the chuck A in right lines by means of the guide C, which enters transverse recesses $a$ in the chuck-body. The gripping-faces $c'$ of the teeth $c$ of one jaw B are in planes parallel to the planes of the gripping-faces $c^2$ of the other jaw B', so that the chucks, it is evident, are adapted to hold only those drills which have cylindrical shanks. To adapt the said chucks to hold a drill D with a taper shank $d$, I use a sleeve E, of steel, tapered internally at $e$ $e'$, so as to fit the taper of the shank $d$. The external surface $f$ of the sleeve E is a true cylindrical surface. Now the sleeve E being fitted tightly on the taper shank $d$ and the drill D and sleeve E being inserted in the chuck A, it is evident that the jaws B B' will close on the sleeve E in the same manner as on drills having a cylindrical shank, and will thus tightly align and hold the drill. The flattened end $g$ of the drill D is inserted into a slot in the plate F, which plate F slides transversely through the chuck A, as described in my aforesaid patent, No. 434,460, and said plate F rotates the drill D as the chuck A is revolved in a lathe. As, however, the said plate F is no part of the present invention, it does not here require further description.

When a solid sleeve E is used, its taper surface $e$ $e'$ must fit the taper shank $d$ of the drill D very snugly, and it is sometimes difficult to get the sleeve E on and off the drill D. To obviate this, I form a longitudinal slot $h$ from end to end of the sleeve E on one side of the sleeve, and said slot $h$ may either be a straight slot or it may be a helicoidal slot, as shown in Fig. 3. Now the slot $h$ gives a certain spring to the sleeve E, so that it is easily put on and off the drill D, and said slot $h$ also allows the sleeve E to undergo a certain compression upon the taper shank $d$ of the drill D when the jaws B B' of the chuck A are closed on the sleeve E. When the jaws are removed from the sleeve E, the spring of the sleeve frees it somewhat from the shank of the drill, so that the drill is easily removed from the sleeve. It is evident that a single sleeve E will fit a number of drills D, since as the diameter of the drill is a little greater or a little less the sleeve E will fit a somewhat greater or a somewhat less distance over the taper shank $d$ of the drill D, and thus will fit various drills, the limit being that the sleeve E shall always slip so far over the taper shank $d$ that the flattened part of the drill D shall enter the slot in the plate F.

Having described my invention, I claim—

1. In combination with a taper-shank drill, a sleeve having its internal surface tapered to fit the taper of the drill-shank and having its outer surface cylindrical to fit the teeth of the jaws of the chuck.

2. In combination with a taper-shank drill, a sleeve having its internal surface tapered to fit the drill-shank and its outer surface cylindrical and said sleeve having a longitudinal slot from end to end through its substance.

3. In combination with a taper-shank drill, a sleeve having its internal surface tapered to fit the drill-shank and its outer surface cylindrical and a helicoidal slot through the substance of the sleeve from end to end thereof.

In testimony that I claim the foregoing as my invention I have signed my name, in presence of two witnesses, this 1st day of June, 1891.

CHARLES T. PRATT.

Witnesses:
C. HUMPHREY,
C. M. BUTLER.